US007946742B2

(12) United States Patent
Iwai et al.

(10) Patent No.: US 7,946,742 B2
(45) Date of Patent: May 24, 2011

(54) IN-VEHICLE ILLUMINATING DEVICE

(75) Inventors: Shiro Iwai, Niiza (JP); Tomoki Kawamura, Niiza (JP); Hiroto Murabayashi, Niiza (JP)

(73) Assignee: Honda Access Corporation, Niiza-Shi, Saitama-Ken (JP)

( * ) Notice: Subject to any disclaimer, the term of this patent is extended or adjusted under 35 U.S.C. 154(b) by 199 days.

(21) Appl. No.: 12/405,500

(22) Filed: Mar. 17, 2009

(65) Prior Publication Data
US 2009/0290368 A1    Nov. 26, 2009

(30) Foreign Application Priority Data

May 23, 2008   (JP) .................................. 2008-136058

(51) Int. Cl.
*B60Q 1/00*   (2006.01)
(52) U.S. Cl. ................... 362/488; 362/296.01; 362/299; 362/300; 362/293
(58) Field of Classification Search .................. 362/471, 362/488, 490, 516, 539, 509, 510, 296.01, 362/299, 300, 293
See application file for complete search history.

(56) References Cited

U.S. PATENT DOCUMENTS

| 7,072,533 | B1 * | 7/2006 | Krier ................................ 385/13 |
| 7,137,718 | B2 * | 11/2006 | Egashira ........................ 362/19 |
| 7,334,925 | B2 * | 2/2008 | Pastrick et al. ............... 362/494 |
| 2002/0034079 | A1 * | 3/2002 | Becker et al. ................. 362/510 |
| 2008/0304273 | A1 | 12/2008 | Clark | |

FOREIGN PATENT DOCUMENTS

| CA | 2511073 A1 | 12/2006 |
| DE | 10347841 A1 | 5/2005 |
| EP | 1243470 A1 | 9/2002 |
| JP | H535489 U | 5/1993 |
| JP | 6-255421 A | 9/1994 |
| JP | 3004568 A | 11/1994 |
| JP | 07-164962 A | 6/1995 |
| JP | 2002-254982 A | 9/2002 |
| JP | 2003-127768 A | 5/2003 |
| JP | 2006-321438 A | 11/2006 |
| JP | 2007-324002 A | 12/2007 |
| JP | 2008-108613 A | 5/2008 |
| WO | 2008/083935 A1 | 7/2008 |
| WO | 2009/055161 A2 | 4/2009 |

OTHER PUBLICATIONS

United Kingdom Search Report dated Jul. 16, 2009, issued in corresponding United Kingdom Patent Application No. GB0904702.8.
Japanese Office Action dated Sep. 6, 2010, issued in corresponding Japanese Patent Application No. 2008-136058.
Japanese Office Action dated Apr. 12, 2010, issued in corresponding Japanese Patent Application No. 2008-136058.

* cited by examiner

*Primary Examiner* — Ali Alavi
(74) *Attorney, Agent, or Firm* — Westerman, Hattori, Daniels & Adrian, LLP

(57) ABSTRACT

An in-vehicle illuminating device capable of preventing light emitted from a light source from coming directly into a passenger's sight. An in-vehicle illuminating device 1 includes a housing 2, a reflective member 18 provided within the housing 2, a light source or LEDs 10 orienting a light axis of light emitted therefrom to the reflective member 18. Reflected light obtained by allowing the reflective member 18 to reflect the light emitted from the LEDs 40 is irradiated to the outside of the housing 2, thus preventing light emitted from the LEDs 40 from coming directly into a passenger's sight.

4 Claims, 6 Drawing Sheets

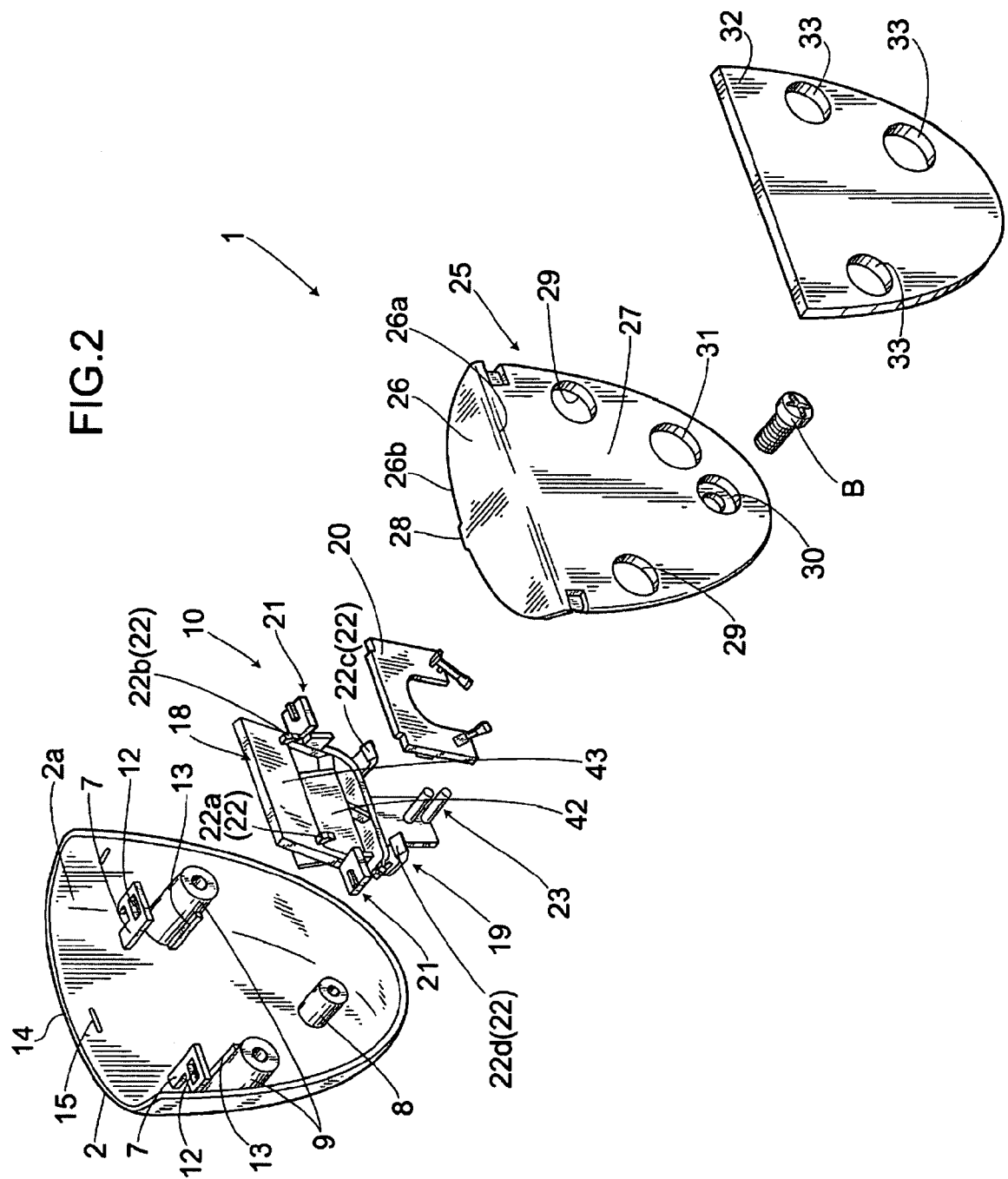

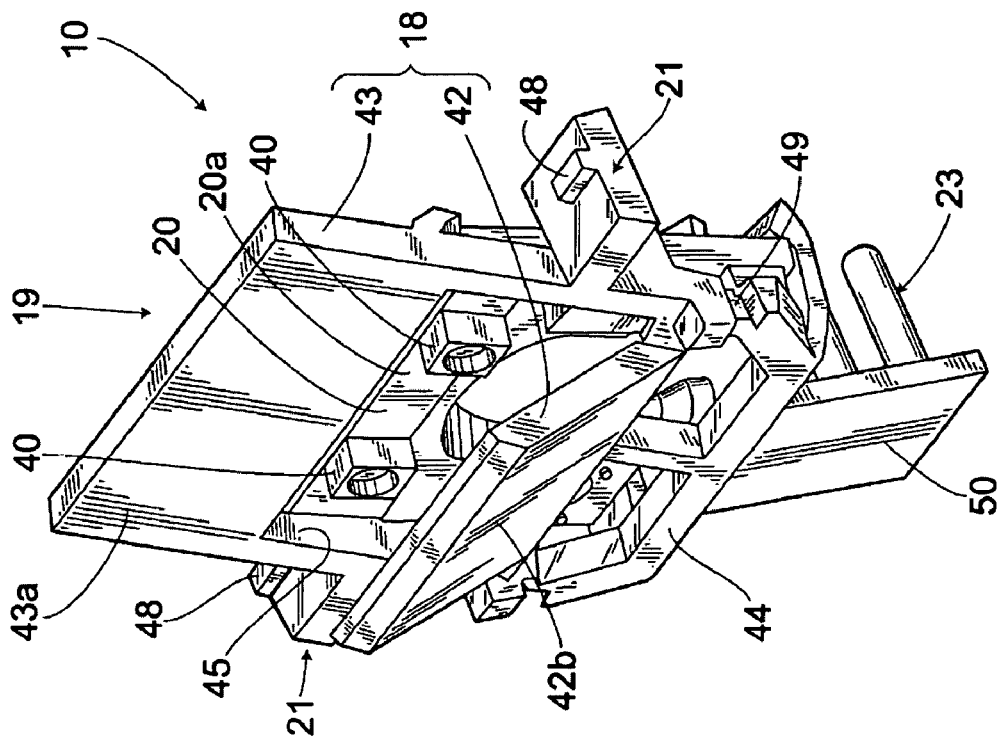
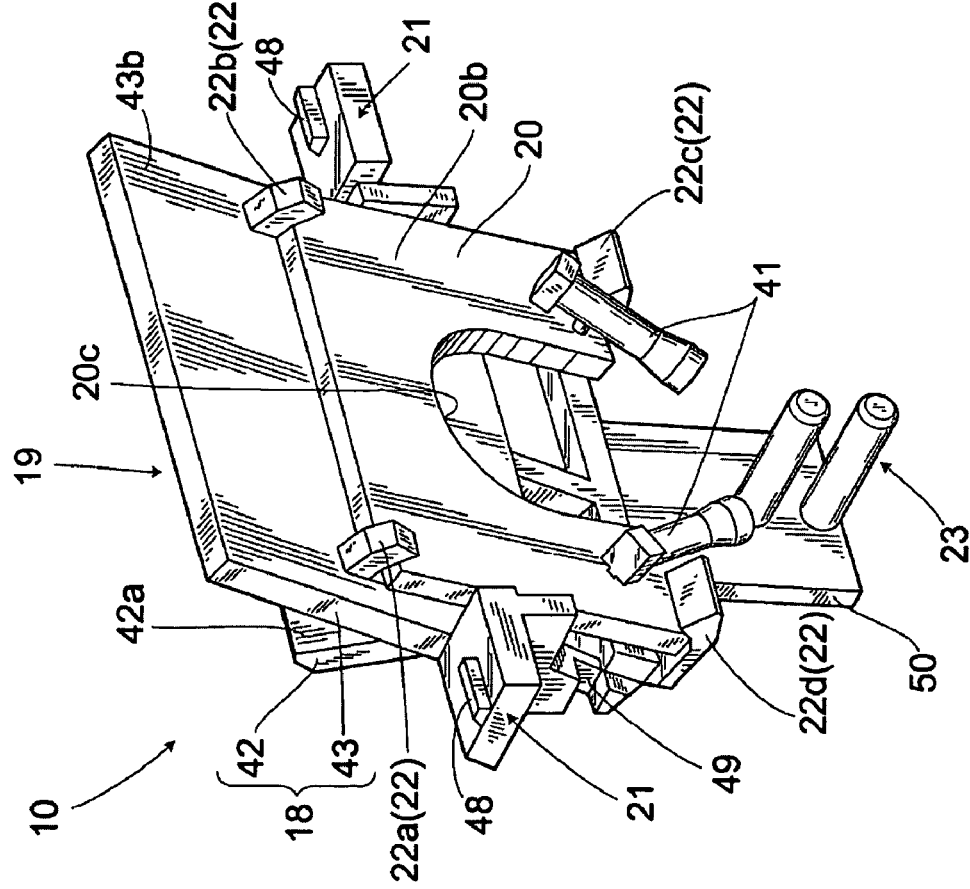

IN-VEHICLE ILLUMINATING DEVICE

BACKGROUND OF THE INVENTION

1. Field of Invention

The present invention relates to an in-vehicle illuminating device, and more particularly, to an illuminating device that is provided on a portion such as a pillar in a vehicle interior.

2. Description of the Related Art

As a conventional in-vehicle illuminating device provided on a portion in a vehicle interior such as a pillar thereof, Japanese Unexamined Patent Application Publication No. 7-164962, for example, discloses the one including a housing and a fluorescent light disposed inside a housing, wherein the device further includes: two windows transparent to the light flux emitted by the light source, the windows being spaced apart from each other and comprising a top window through which light radiation is emitted in a horizontal direction, and a bottom window through which light radiation is emitted downwards; a first directional light reflector disposed between two respective inner edges of the windows; and a second directional light reflector disposed between the two respective outer edges of the windows; the directional light reflectors having shapes that combine to guide the light flux emitted by the fluorescent light towards the transparent windows. A first beam is emitted in an essentially horizontal direction towards the ceiling of the vehicle interior, while a second beam is directed essentially vertically into the activity space thereof in a manner avoiding the passengers sitting on the seat, thus providing lighting without dazzling the passengers.

According to the above-mentioned conventional art, the two light beams are emitted so that they may avoid the passengers on seats, yet there has been a concern that the light rays emitted from the fluorescent light may come directly into the passengers' sight depending on their positions or postures because some of the light rays are emitted through the transparent windows directly into a vehicle interior or cabin.

In view of the above problems, it is, therefore, an object of the present invention to provide an in-vehicle illuminating device which can prevent light rays emitted from a light source from coming directly into a passenger's sight.

SUMMARY OF THE INVENTION

In order to achieve above object, a first aspect of the present invention is an in-vehicle illuminating device comprising:
 a housing;
 a reflective member provided within said housing; and
 a light source orienting a light emission axis of light emitted from said light source to said reflective member,
 wherein reflected light generated by reflecting said light emitted from said light source on said reflective member is irradiated to the outside of said housing.

The in-vehicle illuminating device according to a second aspect of the present invention is a device according to the first aspect in which the housing is provided on a pillar in a vehicle interior and emits the reflected light rays to a ceiling of the vehicle.

The in-vehicle illuminating device according to a third aspect of the present invention is a device according to any one of the foregoing aspects, in which said housing comprises a light transmission part for transmitting said reflected light to the outside of said housing, and a filter for filtering said reflected light emitted to said light transmission part.

According to the in-vehicle illuminating device of the first aspect of the present invention, as the reflected light generated by reflecting the light emitted from the light source on the reflective member is irradiated to the outside of the housing, the light emitted from the light source can be prevented from coming directly into the passenger's sight.

According to the in-vehicle illuminating device of the second aspect of the present invention, the ceiling in the vehicle interior can be illuminated brightly with soft and less uneven reflected light.

According to the in-vehicle illuminating device of the third aspect of the present invention, an illumination effect can be improved because the light can be variously changed through the filters.

BRIEF DESCRIPTION OF THE DRAWINGS

The invention will be more readily understood by reference to the following description, taken with the accompanying drawings, in which:

FIG. 2 is an exploded perspective view showing an entire structure of the in-vehicle illuminating device according to the present embodiment;

FIG. 3 is a perspective view showing a structure of a light source unit of the in-vehicle illuminating device according to the present embodiment, in which FIG. 3(A) is the one seen from a base plate, while FIG. 3(B) is the one seen from a reflective member;

DETAILED DESCRIPTION OF THE PREFERRED EMBODIMENTS

The following is a detailed description of preferred embodiments of the present invention with reference to the appended drawings.

Figure 1:
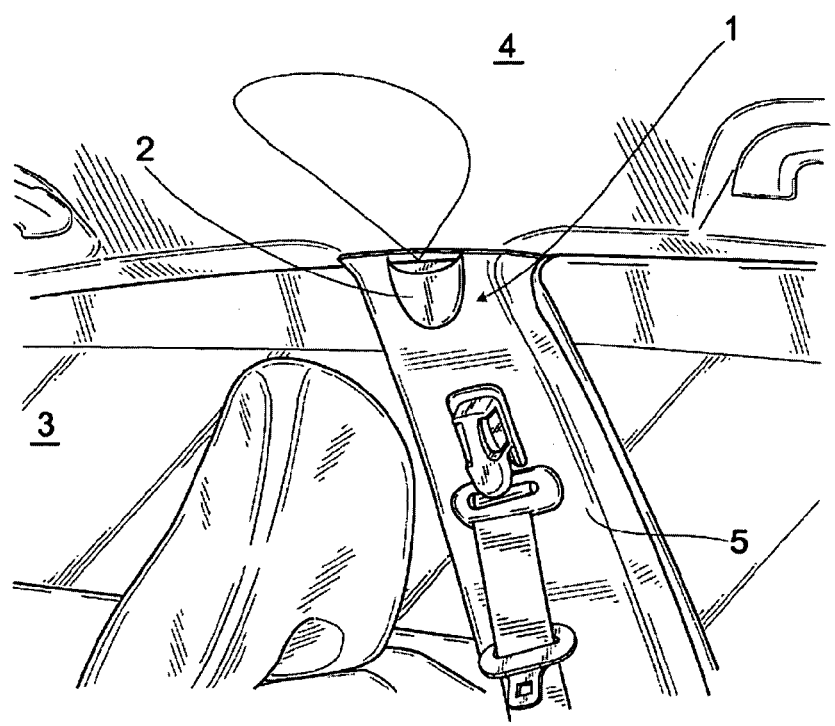
FIG. 1 is a perspective view showing an in-vehicle illuminating device in practical use according to the present embodiment.

An in-vehicle illuminating device 1 shown in FIG. 1 includes a housing 2 and a hereinafter-described light source unit provided inside the housing 2, and is secured to a pillar 5 in a vehicle interior 3 so that reflected light can be irradiated to a ceiling 4 of the vehicle interior 3. The housing 2 is composed of an inverted triangular member made of plastic such as polypropylene, having an outer rim gently curved from the front face toward the rear face, and an opening formed at the top edge thereof. Herein, the term "pillar 5" means the one provided on both sides of a vehicle for supporting windows.

The above-mentioned structure allows the in-vehicle illuminating device 1 to be formed in a thin and flat shape, enabling the broader range of the vehicle interior 3 to be illuminated by irradiating the reflected light toward the ceiling 4 of the vehicle interior 3.

As shown in FIG. 2, the in-vehicle illuminating device 1 includes the housing 2, the light source unit 10 and a lens 25. The reverse face 2a of the housing 2 is provided with retainers 7, a fixation internally-threaded portion 8 and mounting female screws 9 so as to be able to retain the aforementioned light source unit 10.

The retainers 7 are formed at right and left sides on the reverse face 2a of the housing 2 in a manner protruding therefrom, and are each formed with a locking hole 12 that are made vertically through the retainers 7. Moreover, the mounting female screws 9 are each provided below the retainers 7, and elongated projections are each provided on the opposite faces of the mounting female screws 9.

Furthermore, a rim 14 is formed to a predetermined height at the top edge of the housing 2, while an engagement depression 15 located a certain distance below the rim 14 is formed in the middle of the reverse face 2a of the housing 2. Besides, the fixation female screw 8 is formed to secure the lens 25 to the lower middle of the reverse face 2a of the housing 2. The wording "predetermined height" used herein means a height that enables a light transmission part 26 to go out of a user's view due to the light transmission part 26 being disposed behind the housing 2 when the in-vehicle illuminating device 1 is installed on the pillar 5.

The light source unit 10 includes a bracket 19 having a reflective member 18 and a base plate 20 retained by the bracket 19. The bracket 19 also includes locking parts 21 locked relative to the reverse face 2a of the housing 2, a clamp 22 for clamping the base plate 20, shafts 23 around which is wound a wire harness (not shown) that is coupled electrically to the base plate 20. The light source unit 10 is covered with the lens 25 after being locked relative to the reverse face 2a of the housing 2.

The lens 25 includes the light transmission part 26 formed to extend horizontally and a tongue-shaped part 27 hanging down from the outer rim of one end 26a of the light transmission part 26, and is made of a plate member having a certain thickness. The other end 26b of the light transmission part 26 is protruded in the form of curvature, and a lug 28 is provided in the center thereof to engage an engagement depression 15. The tongue-shaped part 27 is formed with two mounting insertion holes 29 into each of which a screw B to be screwed into the mounting female screw 9 is inserted, one fixation insertion hole 30 into which another screw B to be screwed into the fixation female screw 8 is inserted, and a wire insertion hole 31 for drawing the wire harness therethrough toward the outside. The surface of the tongue-shaped part 27 is provided with a light shield member 32. The light shield member 32 is composed of a soft plate-shaped member having a cushioning property, such as sponge, having substantially the same contour as that of the tongue-shaped part 27, and is formed with three holes 33 corresponding to the two mounting insertion holes 29 and the one wire insertion hole 30, respectively.

As shown in FIG. 3B, two LEDs (Light Emitting Diodes) 40 acting as a light source are provided on one surface 20a of the base plate 20, and the wire harness is coupled to the LEDs 40 through connecting terminals 41 on the other surface 20b of the base plate 20. This causes the base plate 20 to light the LEDs 40 by electric power supplied through the wire harness. In the meantime, the base plate 20 is substantially in a rectangular shape, and a lower rim 20c thereof is cut out nearly to the middle of the base plate 20.

The reflective member 18 includes a first light reflector 42 for receiving and then reflecting light emitted from the LEDs 40, and a second light reflector 43 receiving and then reflecting the light reflected by the first light reflector 42.

Both of the first light reflector 42 and the second light reflector 43 are formed of a substantially rectangular member, having reflective faces 42a, 43a formed on respective one surface and opposed to each other. And then, the first light reflector 42 and the second light reflector 43 are connected by a seat 44 at a lower end thereof with the former being displaced vertically from the latter such that they are arranged in a V-shape.

In this way, the first light reflector 42 is provided opposite to the LEDs 40 so that it can receive light emitted from the LEDs 40 and then reflect the light obliquely upward. The second light reflector 43 is provided opposite to the first light reflector 42, that is, parallel to the LEDs 40, so that it can reflect obliquely upward the light reflected by the first light reflector 42. In the meantime, the reflective face 42a of the first light reflector 42 and the reflective face 43a of the second light reflector 43 are formed to have substantially the same surface area.

A rectangle hole 45 is formed at the central region of the lower half of the second light reflector 43. The clamp 22 is provided on the other surface 43b of the second light reflector 43. The clamp 22 includes locking claws 22a,22b,22c,22d provided at the four corners of the rectangle hole 45, respectively, and is formed to allow the base plate 20 to be clamped therebetween. The locking claws 22a,22b,22c,22d are made of key-shaped members protruded from the other surface 43b of the second light reflector 43 toward the inside of the rectangle hole 45. The clamp 22 having such a structure allows the bracket 19 and the base plate 20 to be integrated with each other by clamping the base plate 20 with the one surface 20a having LEDs 40 facing the rectangle hole 45.

The locking parts 21 are provided so as to protrude from both sides of the second-light reflector 43. Each locking part 21 includes a projection 48 formed so as to engage with the locking hole 12 of the retainer 7 provided on the reverse face 2a of the housing 2 and a depression 49 formed so as to allow the elongated projection 13 to be inserted thereinto, each elongated projection 13 being provided on the opposite faces of the mounting female screw 9. The projections 48 are formed so as to protrude upwards, and the depressions 49 are formed so as to dent the side of the second light reflector 43 inwards.

The shafts 23 are provided on a strip 50 protruded from the lower end of the seat 44. These shafts 23 are protruded vertically from the strip 50 toward the other surface 20b of the base 20 that is not provided with the LEDs 40, and there are two shafts 23 vertically provided side by side.

According to the above-structured light source unit 10, with the other surface 42b of the first light reflector 42 facing the reverse face 2a of the housing 2, the projections 48 are engaged with the locking holes 12 while inserting the elongated projections 14 into the depressions 49 of the locking parts 21, thereby mounting the light source unit 10 to the housing 2.

Next, the lug 28 formed on the outer rim of the other edge 26b of the light transmission part 26 of the lens 25 is inserted into the engagement depression 15 provided on the reverse face 2a of the housing 2. At this time, the wire harness coupled electrically to the other surface 20b of the base plate 20 through the terminals 41 is drawn out through the wire insertion hole 31.

And then, the lens 25 is secured to the housing 2 by inserting the screw B into the fixation insertion hole 30 to be screwed into the fixation female screw 8. The light shield member 32 is attached onto the surface of the tongue-shaped part 27 of the lens 25 fixed to the housing 2, using a two-sided adhesive tape (not shown) or the like.

It should be noted herein that according to the above-structured in-vehicle illuminating device 1, the engagement depression 15 formed on the reverse face 2a of the housing 2 is formed in the location a certain distance below the rim 14, and thus the light transmission part 26 is secured to the location the distance below the rim 14.

Figure 4:
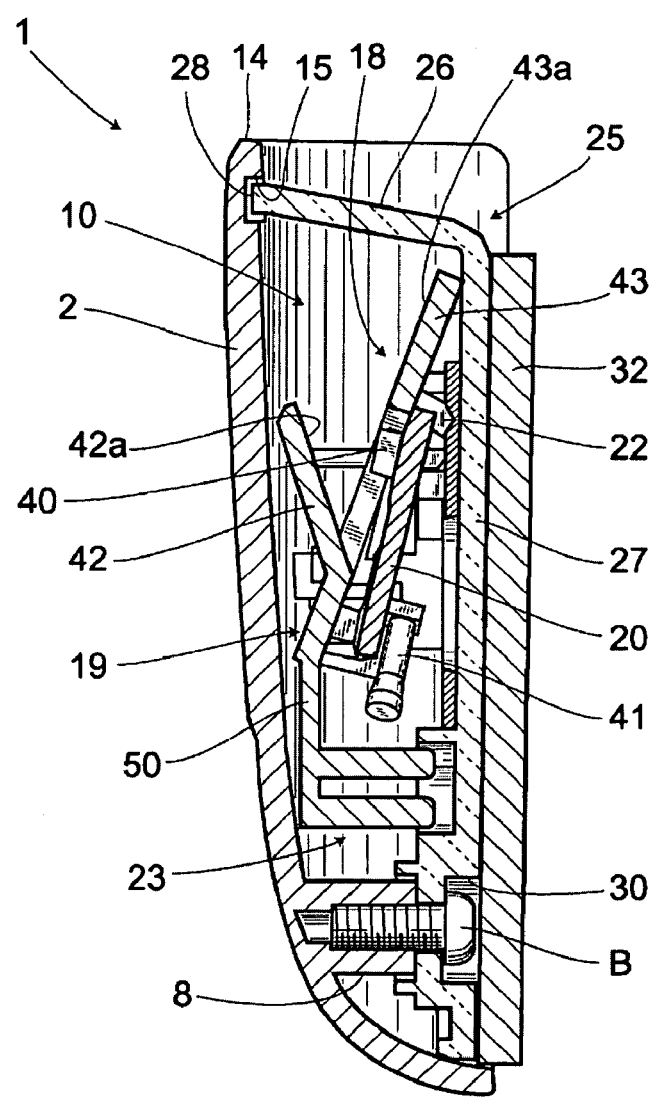
FIG. 4 is a longitudinal sectional view showing the structure of the in-vehicle illuminating device according to the present embodiment.

Next is a description of effects and operations for each part of the in-vehicle illuminating device 1 having the above structure. When a switch (now shown) is turned on, the in-vehicle illuminating device 1 allows, as shown in FIG. 4, the LEDs 40 provided on the base plate 20 to emit light toward the first light reflector 42 provided adjacent to the housing 2. The light thus emitted is then reflected by the first light reflector 42. Since the first light reflector 42 is inclined upward, it reflects the light thus received toward the second light reflector 43 provided adjacent to the lens 25. The light reflected by this first light reflector 42 is hereinafter called a primary reflection light.

The primary reflection light is reflected by the second light reflector 43. Since the second light reflector 43 is inclined upward, the primary reflection light thus received is reflected to the light transmission part 26. The light reflected by this second light reflector 43 is hereinafter called a secondary reflection light.

In this way, the in-vehicle illuminating device 1 is allowed to emit the secondary reflection light through the light transmission part 26 of the lens 25 to the outside. Therefore, the in-vehicle illuminating device 1 is structured so as not to pass the light emitted from the LEDs 40 directly from the housing 2 to the outside thereof, so that it is possible to prevent the light emitted from the LEDs 40 from coming directly into a passenger's sight.

Figure 5:
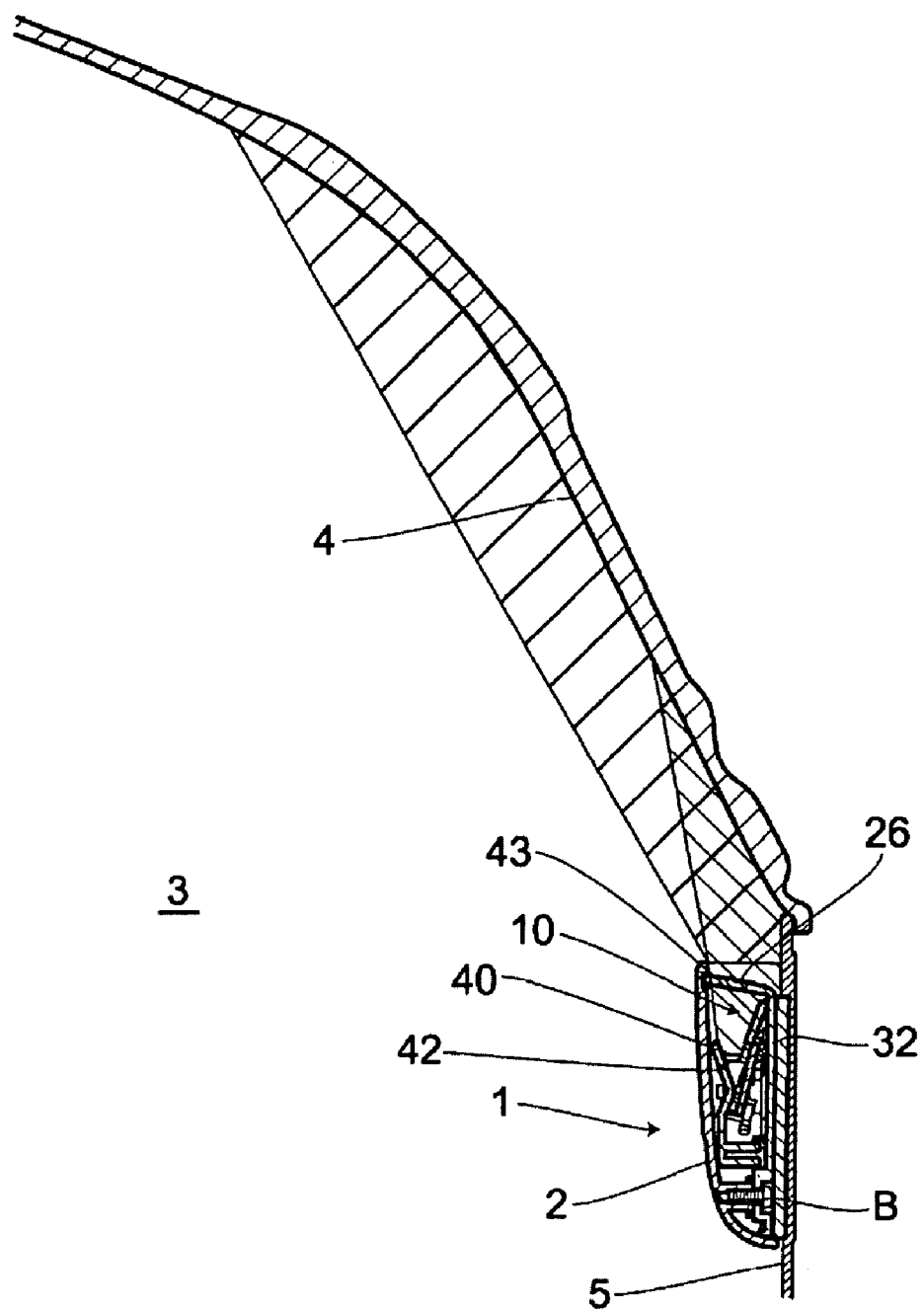
FIG. 5 is a longitudinal sectional view showing the in-vehicle illuminating device in practical use according to the present embodiment.

This in-vehicle illuminating device 1 is attached to the pillar 5 by bringing the light shield member 32 into contact with the surface of the pillar 5 of the vehicle interior 3, and then inserting the screws B into the mounting insertion holes 29 from the reverse face of the pillar 5 (FIG. 5) to thereby be screwed into the mounting female screws 9. In this manner, the in-vehicle illuminating device 1 is attached to the pillar 5 through the light shield member 32, so that it is possible to prevent the leaking of light emitted from the LEDs 40 and light reflected by the reflective member 18 from a gap between the tongue-shaped part 27 of the lens 25 that closes the reverse face 2a of the housing 2 and the surface of the pillar 5. As a result, it is possible to provide a increased lighting, while enabling the light emitted from the LEDs 40 to be prevented from coming directly into a passenger's sight.

Moreover, due to the light shield member 32 being made of the soft plate-shaped member having a cushioning property, the light shield member 32 is allowed to come into close contact with the surface of the pillar 5. Thus, the in-vehicle illuminating device 1 can reliably prevent the leaking of emitted light and reflected light from portions other than the light transmission part 26 as well as the vibrating of the light source unit 10 because the light shield member 32 can absorb vehicle vibration. Accordingly, the in-vehicle illuminating device 1 enables the light of LEDs 40 to be emitted only from the light transmission part 26 to the outside, and thus, it is possible that the light emitted from the LEDs 40 can be prevented from coming directly into a passenger's sight.

According to the in-vehicle illuminating device 1, light emitted from the LEDs 40 is reflected by the first light reflector 42 as the primary reflection light, and then the secondary reflection light generated by reflecting the primary reflection light by the second light reflector 43 is emitted from the light transmission part 26, so that the in-vehicle illuminating device 1 more reliably enables only reflected light to be emitted to the outside of the housing 2. As a result, it is possible for the in-vehicle illuminating device 1 to prevent the light emitted from the LEDs 40 from coming directly into a passenger's sight.

Since the secondary reflection light is generated by allowing the second light reflector 43 to further reflect the primary reflection light reflected by the first light reflector 42, the in-vehicle illuminating device 1 enables softer light to be emitted toward a broader area, as compared to conventional devices.

Also, since the light transmission part 26 is secured to the location a certain distance below the rim 14 of the housing 2, the in-vehicle illuminating device 1 can more reliably prevent the light transmission part 26 from coming into a passengers' sight.

Furthermore, the lower rim 20c of the base plate 20 is cut out nearly to the middle of the base plate 20, so that the area contacting the air increases and thus cooling effect can be enhanced.

The lens 25 includes the light transmission part 26 formed to extend horizontally and the tongue-shaped part 27 hanging down from the outer rim of one end 26a of the light transmission part 26, and is attached to the pillar 5 of the vehicle interior 3 at the tongue-shaped part 27. Therefore, the number of components and the number of production man-hours for the in-vehicle illuminating device 1 can be reduced since the lens 25 has the configuration that the light transmission part 26 transmitting the secondary reflection light and the tongue-shaped part 27 attached to the pillar 5 are integrated with each other.

Furthermore, the reflective member 18 and the base plate 20 are integrated with each other, and the first light reflector 42 and the second light reflector 43 are provided in such a manner as to be vertically displaced from each other to be arranged in a V shape, so that the in-vehicle illuminating device 1 can be made thin, and therefore the dimension of the in-vehicle illuminating device 1 can be made small as a whole.

Figure 6:
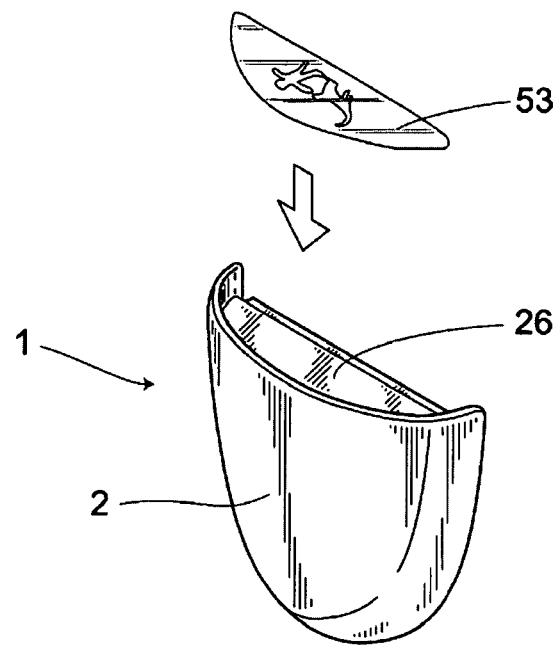
FIG. 6 is a perspective view showing the structure of the in-vehicle illuminating device according to a modified example of the in-vehicle illuminating device according to the present embodiment; and, FIG. 7 is a perspective view showing the in-vehicle illuminating device in practical use according to the modified example of the in-vehicle illuminating device according to the present embodiment.

Alternatively, a filter 53 may be detachably provided on the light transmission part 26, as shown in FIG. 6. This filter 53 may be selected accordingly from various patterns such as a colored one, a punched lettering one, or a design pattern which a user wants to project on the ceiling 4 of the vehicle interior 3.

Figure 7:
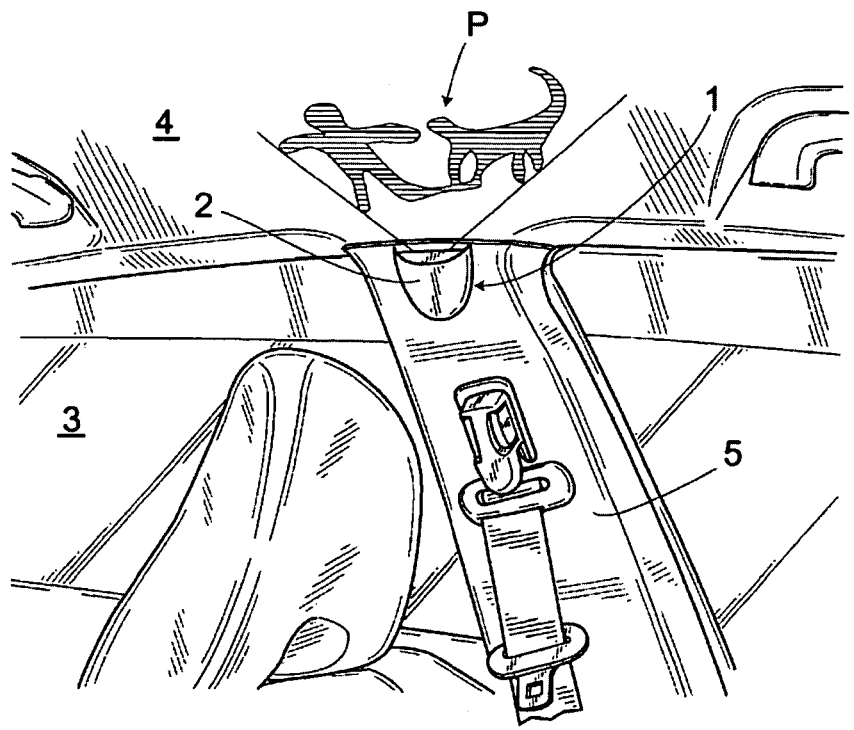

For example, when the design-patterned filter 53 is selected, a design pattern P can be projected on the ceiling 4 of the vehicle interior 3 by the reflected light from the light transmission part 26, as illustrated in FIG. 7. As described above, the in-vehicle illuminating device 1 according to the present embodiment enables soft light to be emitted to a broader area, and thus the enlarged image of the design pattern can be projected on the ceiling 4 by the secondary reflection light.

Still alternatively, a cover made of a black rubber material (not shown) may be used instead of the filter 53 to cover the light transmission part 26 to thereby provide light-shielding against the secondary reflection light. Thus, in a case that a plurality of the in-vehicle illuminating devices 1 are provided in the vehicle interior 3, lights-out condition can be realized without providing a power-on switch for each.

The present invention is not limited to the foregoing embodiment, and various modifications can be implemented within the scope of the gist of the invention. For example, although the in-vehicle illuminating device 1 is provided so as to irradiate reflected light to the ceiling 4 of the vehicle interior 3 in the foregoing embodiment, the reflected light may be irradiated to the floor of the vehicle interior 3.

Also, whilst the in-vehicle illuminating device 1 is provided on the pillar 5 in the foregoing embodiment, it may be provided on the inside of doors, for example.

Still also, although the light shield member 32 is made of sponge in the foregoing embodiment, the light shield member 32 may be made of any other suitable material such as rubber because it will suffice if only the member can prevent light emitted from LEDs 40 and reflected light from the reflective member 18 from leaking from any other portions than the light transmission part 26 to the outside of the housing 2.

What is claimed is:

1. An in-vehicle illuminating device comprising:
   a housing;
   a reflective member provided within said housing; and
   a light source orienting a light emission axis of light emitted from said light source to said reflective member,
   wherein said housing comprises a light transmission part to transmit reflected light to the outside thereof, said reflected light being generated by reflecting said light emitted from said light source on said reflective member,
   wherein said reflective member comprises a first light reflector receiving light emitted from said light source and reflecting primary reflection light, and a second light reflector receiving said primary reflection light and reflecting secondary reflection light, said secondary reflection light being emitted through said light transmission part, and
   wherein said housing is provided on a pillar in a vehicle interior of a vehicle, and allows said reflected light to be emitted to a ceiling of said vehicle.

2. The in-vehicle illuminating device according to claim 1, wherein said housing is provided on said pillar in the vehicle interior of the vehicle through a soft plate-shaped member having a light shielding property and a cushioning property.

3. The in-vehicle illuminating device according to claim 2, wherein said housing comprises a filter for filtering said reflected light emitted to said light transmission part.

4. The in-vehicle illuminating device according to claim 1, wherein said housing comprises a filter for filtering said reflected light emitted to said light transmission part.

* * * * *